Nov. 11, 1952

C. T. MINKLER 2,617,703

TORPEDO RECORDING MECHANISM

Filed May 9, 1933

Inventor:
Chester T. Minkler
by Robert A. Lavender
Attorney

Nov. 11, 1952　　　　　C. T. MINKLER　　　　　2,617,703
TORPEDO RECORDING MECHANISM
Filed May 9, 1933　　　　　　　　　　　　　　　　3 Sheets-Sheet 2

Inventor:
Chester T. Minkler
by Robert A. Lavender
Attorney.

Nov. 11, 1952     C. T. MINKLER     2,617,703
TORPEDO RECORDING MECHANISM
Filed May 9, 1933     3 Sheets-Sheet 3
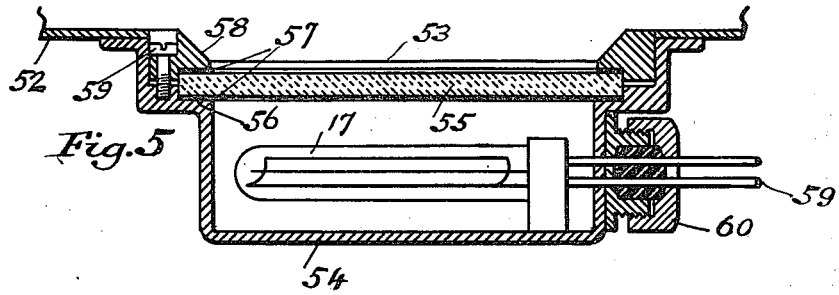
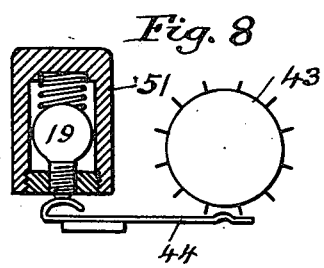
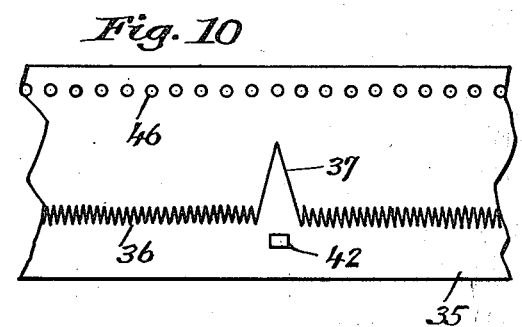
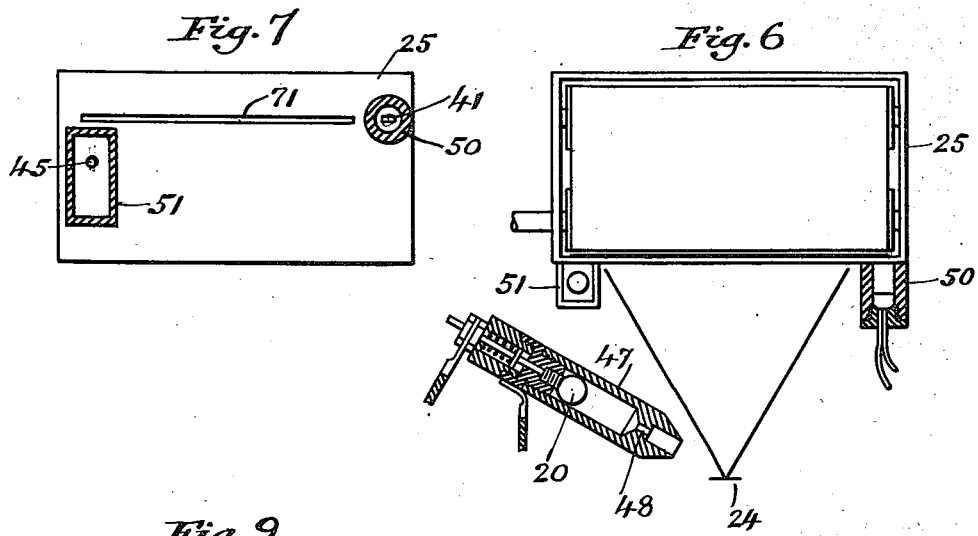
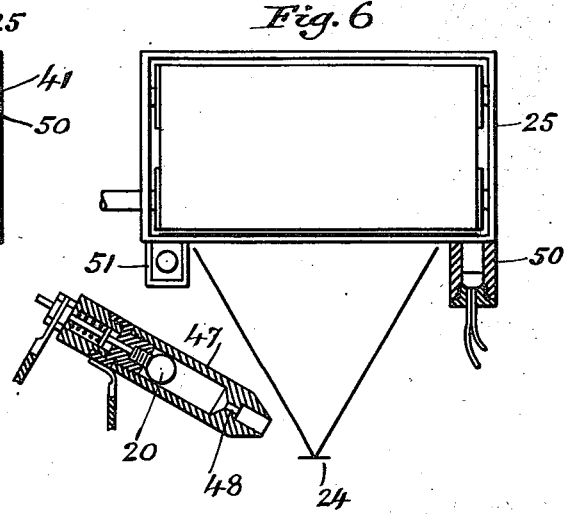
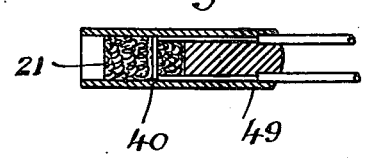
Inventor:
Chester T. Minkler
by Robert A. Lavender
Attorney.

Patented Nov. 11, 1952

2,617,703

UNITED STATES PATENT OFFICE 2,617,703

TORPEDO RECORDING MECHANISM

Chester T. Minkler, Newport, R. I., assignor to the United States of America as represented by the Secretary of the Navy Application May 9, 1933, Serial No. 670,192

2 Claims. (Cl. 346—38)

(Granted under the act of March 3, 1883, as amended April 30, 1928; 370 O. G. 757)

The invention described herein may be manufactured and used by or for the Government of the United States of America for governmental purposes without the payment of any royalties thereon or therefor.

This invention relates to recording mechanism, and more particularly to a recording mechanism for a torpedo which indicates whether or not the torpedo passes under the target vessel and the relative position thereunder at which the explosion of the torpedo would have taken place.

Recent developments in torpedo exploding mechanisms have produced apparatus that can be caused to function merely by passing under and without touching the target ship. The present invention was conceived and developed in order to be able to test and study the operation of such exploding mechanisms. It is designed to record on a moving camera film, the shadow of the target ship as the torpedo passes under it, the exact point in relation to said target ship at which the exploding mechanism operates, and the time elapsed from the launching of the torpedo to its arrival under the target ship.

One of the objects of this invention is to provide a recording device that will record, on a moving camera film the shadow of a ship under which the torpedo passes.

Another object is to provide a recording mechanism that will record, on the same film, the exact point in relation to said ship at which the exploding mechanism operates.

Another object is to provide a recording mechanism that will record, on the same film, the time elapsed between the launching of the torpedo and its arrival under said ship.

A further object is to provide a recording mechanism that makes possible the testing of the newly developed exploding mechanism under actual service conditions.

With the above and other objects in view, this invention consists of such construction, combination and arrangement of parts as will be more fully described hereinafter, in connection with the accompanying drawings, in which:

Fig. 5 shows a photo-electric cell mounted near a window in the body of the torpedo;

Fig. 6 is a plan view of the camera showing the projection lamp and reflecting mirror;

Fig. 7 is an elevation of the camera showing the openings for admitting the various recording light beams;

Fig. 8 shows a contact wheel and timing light for producing a record of elapsed time from the launching of the torpedo;

Fig. 9 shows a device for producing a flash at the instant the exploding mechanism operates;

Fig. 10 shows a section of recording film illustrating a typical record.

Figure 1:
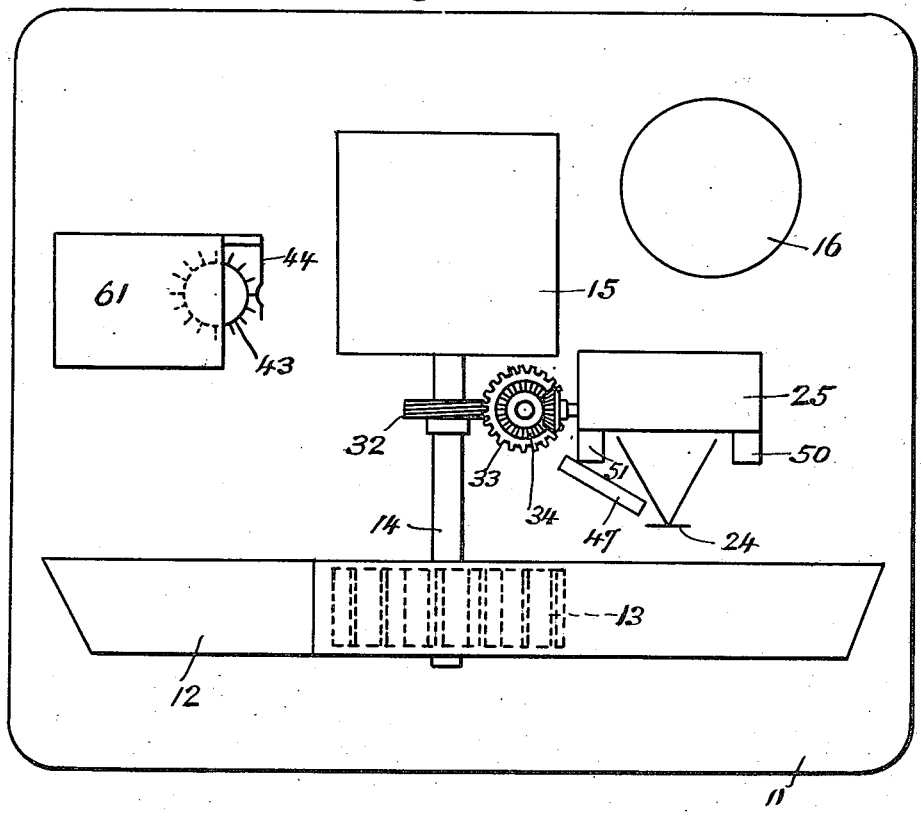
Fig. 1 is a diagrammatic view of the arrangement of the apparatus of this invention as assembled in the body of a torpedo.
Figure 2:
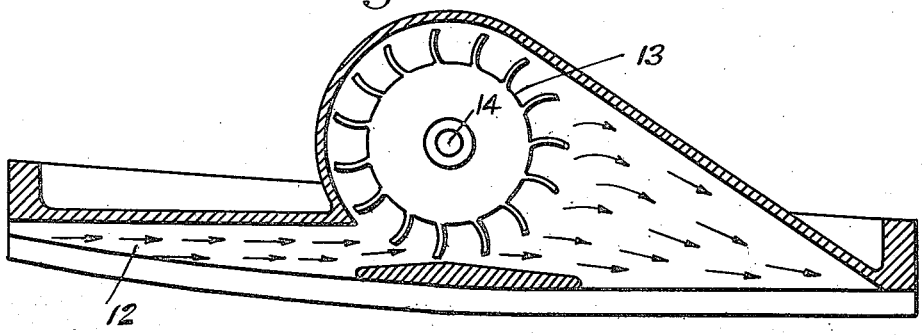
Fig. 2 shows a device for acquiring power for the apparatus of this invention.

Referring now to Fig. 1, 11 denotes the base that forms an integral part of the hull, fragmentarily shown and designed at 52 in Fig. 5, of the torpedo and in addition carries the completely assembled recording apparatus other than the photo-electric cell. Its outer surface is made to conform to the contour of the torpedo so that it will not increase the normal resistance to the travel of the torpedo through the water. Cast in the under side of the base plate 11 is a channel 12 that permits the water flowing through it to act on the impeller or water wheel 13 housed therein. Impeller 13, through shaft 14, drives generator 15 which supplies the electrical energy for the circuits comprising an amplifying triode 16, a photo-electric cell 17, potential divider 18, timing lamp 19, projection lamp 20, fuse 21, resistance 22 and galvanometer 23, as will be more fully described hereinafter. When the torpedo passes under the ship there is a reduction in the current flowing through photo-electric cell 17 which causes a reduction in the plate circuit of vacuum tube 16, which reduction of current causes the galvanometer armature 23 to move and rotate mirror 24 about a vertical axis thereby changing the direction of the beam of light reflected therefrom, which makes an indication on the moving film in camera 25.

After launching, and as the torpedo is propelled through the water, there is created a flow of water through channel 12, causing the rotation of impeller 13 that, through shaft 14, drives generator 15. The shunt field 26 is such that the generator quickly builds up to its operating potential, but in order to maintain this potential of the generator comparatively constant with varying torpedo speeds, an opposing field winding 27 is provided. This opposed field winding is in series with a gas tube 28 which, when the potential of the generator reaches a predetermined value, permits a flow of current through the opposed field winding, thereby reducing the field of the generator and tending to maintain its potential output constant regardless of the speed of rotation of the impeller. The generator 15 is provided with two armatures 29 and 30. Armature 29 supplies grid and plate potential for tube 16 and potential for photo-electric cell 17, while armature 30 supplies potential for lighting the filament of tube 16, timing light 19, projection light 20 and fuse 21. The potential divider 18 is across the terminals of armature 29, and the filament of tube 16 is connected to the potential divider at 31. The grid of tube 16 is connected through resistance 22 to the negative end of potential divider 18. It is clear that this causes the filament of tube 16 to assume a higher potential than its grid, or in other words the tube has a negative bias, and this bias of tube 16 is so adjusted that the tube operates at the midpoint of its amplification curve. The photo-electric cell being exposed to the light coming through the water and window 55 permits a flow of current toward the grid of tube 16 which slightly reduces the bias on tube 16. The normal plate current flowing through galvanometer 23 rotates the mirror 24 clockwise until the beam of light from projection lamp 20 passes into camera 25 through the right-hand end of slit 71. The film in camera 25 from the time the torpedo is launched, is continuously moved past slit 71 through shaft 14, worm 32, wheel 33 and bevel gears 34, and the reflected beam from the projection lamp 20 affects the sensitive film to produce thereon the line 36. As the torpedo passes under the target ship the current flowing through photo-electric cell 17 is reduced thereby decreasing the drop in potential that it creates in resistance 22 which results in an increase in the bias on the grid of tube 16. The increase of bias reduces the plate current, permitting mirror 24 to rotate counterclockwise which, in turn, causes the beam of light from the projection lamp 20 to produce an indication of the ship's shadow on the sensitive film as shown by the hump 37 in line 36. The detonator in an armed torpedo is replaced by an electrical switch 39 that is designed to be closed when the exploding mechanism operates. The closing of switch 39 completes an electrical circuit to fuse 21 which comprises a wisp of gun cotton on a platinum bridge 40. When the circuit of which the bridge is a part is closed, the bridge is heated to a fusing point and ignites the gun cotton. The flash thus produced projects a beam of light through opening 41 into the camera box that makes an indication 42 on the sensitive film. The position of indication 42 with relation to the hump 37 shows the approximate position under the ship at which the exploding mechanism operates and hence the position at which the explosion would occur. A clock mechanism through interrupter 43 and recording lamp 19 operates to create an indication on the camera film of the elapsed time between launching of the torpedo and its arrival at the target ship. Each time a prong of interrupter 43 makes contact with arm 44 it causes lamp 19 to flash and project a beam of light through opening 45 to create the indications 46 shown on the film.

Figure 3:
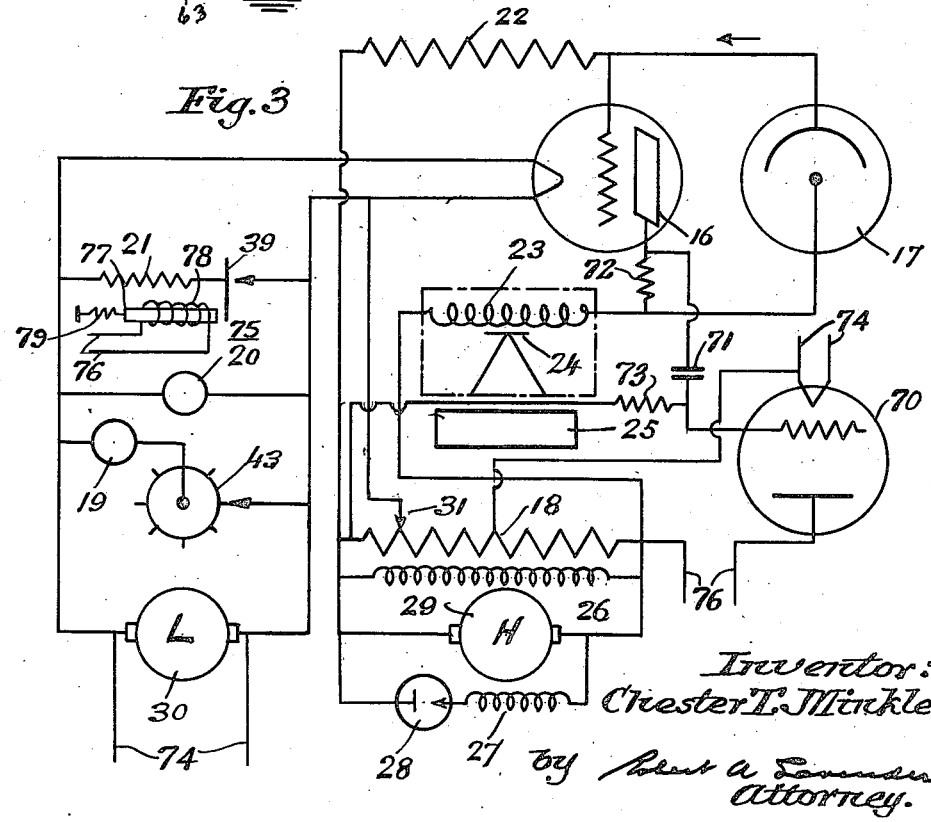
Fig. 3 is a wiring diagram showing the electrical circuits employed in this invention when the source of power is a generator.

The mechanism for operating switch 39 is similar to the means for operating the exploder in my copending application, Serial No. 646,019, filed December 6, 1932. As shown in Fig. 3, the grid of vacuum tube 70 is connected through condenser 71 to the low potential end of resistance 72 in the plate lead of tube 16 and through resistance 73 to the low voltage end of potential divider 18, the latter placing a negative bias on the grid of tube 70 to block the tube. The cathode of tube 70 is fed through leads 74. When the shadow of a target falls on photoelectric tube 17, the current through the tube 17 is greatly reduced, which permits the grid of tube 16 to be swung more strongly negative, thus greatly reducing the plate current through tube 16. This causes a rise in potential at the end of resistance 72 to which condenser 71 is connected, and this rise is transmitted through condenser 71 to the grid of tube 70, permitting a brief flow of current through tube 17.

Solenoid 75, connected in the plate circuit of tube 70 by leads 76, has a core 77 that is biased to an asymmetrical position in the coil 78 by spring 79. When current flows through tube 70 the core 77 is drawn into coil 78 and closes switch 39, permitting current to flow to heat resistance bridge 40 and firing charge 21. While the flow of current through tube 70 is only momentary, that is sufficient to actuate solenoid 75, which is a part of the exploding mechanism of the torpedo.

The projection lamp 20 is mounted in tube 47 with a small opening 48 that will emit a pencil of light. The fuse 21 is mounted in a casing 49 which is fitted into housing 50 which surrounds opening 41. The recording lamp 19 is mounted in a container 51 that surrounds opening 45.

The photo-electric cell 17 is mounted within the torpedo near a window provided in the upper portion of the hull of the torpedo. In the drawing, numeral 52 represents a portion of the hull of a torpedo having an opening 53 over which a casing 54 is mounted. The glass 55 fits into a recess 56 of the casing 54 that is provided with gaskets 57 and is held in place by ring 58 that is secured to the casing by screws 59. The leads 59 from the photo-electric cell pass through the stuffing box 60.

Tests indicate that daylight without bright sunlight is sufficient for satisfactory operation of this apparatus.

Figure 4:
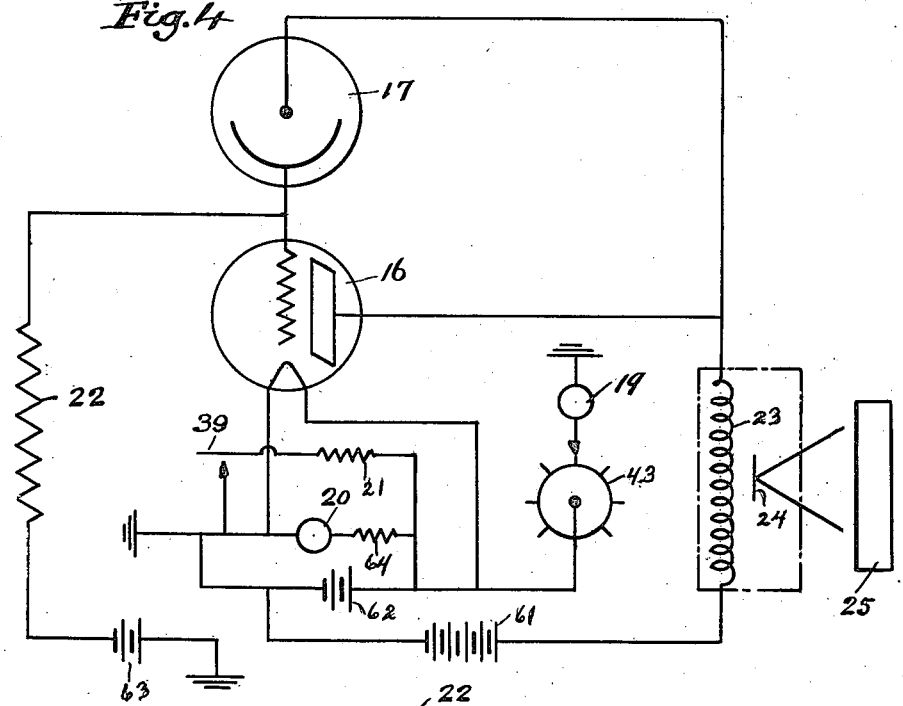
Fig. 4 is a similar diagram showing the power being supplied by batteries.

The entire apparatus may be energized by batteries 61, 62 and 63 as shown in Fig. 4 instead of by the generator. In this arrangement a small control resistance 64 is shown in series with lamp 20. Grid bias for tube 16 is supplied by battery 63, plate voltage by battery 61 and current for the filament of tube 16 and for lamps 19 and 20 by battery 62.

I claim:

1. The combination with a torpedo body, of a photocell disposed therein to be energized by light from the exterior of said body, a thermionic relay connected to said cell to have its output decreased by decrease in current from said cell, means to record the magnitude controlled by light to be operated upon diminution of such light, and means responsive to reduction of said output to indicate on the record made by said recording means the relative times of operation of the firing mechanism of the torpedo and of the said decrease in current from said cell.

2. The combination with a torpedo body, of a light transmitting portion in said body, a thermionic tube, means to bias said tube for low current output, a photoelectric cell disposed to be energized by light through said portion and connected to said tube to increase the current output of said cell when the torpedo is running in open water, a movable photo-sensitive film, a current responsive device including a movable mirror connected to said tube to hold said mirror in one position while said photoelectric cell is energized and permit said mirror to move to another position when the current from said tube is reduced, said mirror being positioned to reflect light to said film, a first source of light placed to project a beam upon said mirror to be reflected to said film, whereby when the light impinging upon said photoelectric cell is reduced by the shadow of a ship and the output of said vacuum tube is consequently diminished, the reflected beam of light is moved to a different position on said film, a second source of light disposed to project a beam upon said film, means to effect periodic projection of the beam from said second source to make a time record upon said film, a body of explosive positioned adjacent said film whereby light due to the explosion thereof makes a record upon said film, and means responsive to diminution of the output current from said vacuum tube due to said shadow to initiate the explosion of said body.

CHESTER T. MINKLER.

REFERENCES CITED

The following references are of record in the file of this patent:

UNITED STATES PATENTS

| Number | Name | Date |
|---|---|---|
| 689,650 | Moriarty | Dec. 24, 1901 |
| 1,300,191 | Pogue | Apr. 8, 1919 |
| 1,406,445 | Culver | Feb. 14, 1922 |
| 1,430,800 | Dieter | Oct. 3, 1922 |
| 1,485,017 | Cohen | Feb. 26, 1924 |
| 1,487,898 | Stolp | Mar. 25, 1924 |
| 1,489,566 | Webster | Apr. 8, 1924 |
| 1,503,401 | Wechsler | July 29, 1924 |
| 1,601,914 | Hammond | Oct. 5, 1926 |
| 1,623,475 | Hammond | Apr. 5, 1927 |
| 1,626,663 | Brace | May 3, 1927 |
| 1,743,792 | Moeger | Jan. 14, 1930 |
| 1,850,909 | Bahney | Mar. 22, 1932 |
| 1,880,942 | Erickson | Oct. 4, 1932 |
| 2,060,198 | Hammond | Nov. 10, 1936 |

FOREIGN PATENTS

| Number | Country | Date |
|---|---|---|
| 389,184 | Germany | Mar. 22, 1924 |